(12) United States Patent
Albou et al.

(10) Patent No.: US 10,364,957 B2
(45) Date of Patent: Jul. 30, 2019

(54) LIGHTING DEVICE WITH IMAGE PROJECTION AND DISPLAY

(71) Applicant: VALEO VISION, Bobigny (FR)

(72) Inventors: Pierre Albou, Bobigny (FR); Joel Li, Bobigny (FR); Valere Calais, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/977,402

(22) Filed: May 11, 2018

(65) Prior Publication Data

US 2018/0328564 A1    Nov. 15, 2018

(30) Foreign Application Priority Data

May 11, 2017 (FR) ..................... 17 54128

(51) Int. Cl.
| | |
|---|---|
| *F21S 43/31* | (2018.01) |
| *B60Q 1/26* | (2006.01) |
| *F21S 43/20* | (2018.01) |
| *B60Q 1/50* | (2006.01) |
| *G03B 21/10* | (2006.01) |
| *F21S 43/00* | (2018.01) |
| *G03B 29/00* | (2006.01) |
| *F21W 105/00* | (2018.01) |

(52) U.S. Cl.
CPC ............ *F21S 43/31* (2018.01); *B60Q 1/2607* (2013.01); *B60Q 1/50* (2013.01); *F21S 43/00* (2018.01); *F21S 43/26* (2018.01); *G03B 21/10* (2013.01); *G03B 29/00* (2013.01); *F21W 2105/00* (2018.01)

(58) Field of Classification Search
CPC .... F21S 48/234; F21S 48/2212; F21S 48/214; F21S 8/10; B60Q 1/2607
See application file for complete search history.

(56) References Cited

U.S. PATENT DOCUMENTS

| | | |
|---|---|---|
| 2008/0198372 A1 | 8/2008 | Pan |
| 2015/0156448 A1 | 6/2015 | Lee |
| 2017/0305332 A1 | 10/2017 | Albou et al. |
| 2017/0307168 A1 | 10/2017 | Albou et al. |

FOREIGN PATENT DOCUMENTS

| | | | |
|---|---|---|---|
| WO | WO 2016/050503 A1 | 4/2016 | |
| WO | WO 2016/050967 A1 | 4/2016 | |

OTHER PUBLICATIONS

French Preliminary Search Report dated Jan. 3, 2018 in French Application 17 54128 filed on May 11, 2017 (with English Translatioh of Categories of Cited Documents).

*Primary Examiner* — Joseph L Williams
(74) *Attorney, Agent, or Firm* — Oblon, McClelland, Maier & Neustadt, L.L.P.

(57) ABSTRACT

A lighting device, for a motor vehicle, including a transparent or translucent screen; and a lighting module able to project a light beam onto the screen. The screen includes a first diffusive area and a second non-diffusive area, such that a first part of the light beam, projected onto the first area, is diffused by the screen and that a second part of the beam is transmitted by the screen to an external projection surface.

20 Claims, 1 Drawing Sheet

LIGHTING DEVICE WITH IMAGE PROJECTION AND DISPLAY

The invention pertains to the field of lighting and/or light signalling, in particular for motor vehicles.

The patent document published under number WO 2016/050503 A1 discloses a light signalling device for a motor vehicle, configured to display a pictogram on an area of a display screen through transmission. The screen corresponds to an outer lens for closing the housing of the device. The pictogram is produced by a first lighting module that may comprise a microelectromechanical system with a mirror array that is able to be controlled and produce various pictograms. The device may also comprise a second lighting module configured to light another area of the display screen, separate from the area displaying the pictogram. Such a device is beneficial in that it combines a plurality of light signalling functions in one and the same device, one of the light signalling functions comprising the displaying of the pictogram. As is apparent from this teaching, displaying a pictogram requires a lighting module that is potentially bulky, essentially in that it has to project the pictogram onto an area of the outer lens of the device that has to have a minimum size in order for the pictogram to be able to be seen by observers in the vicinity of the vehicle. This means that the remaining area(s) of the outer lens are reduced in size. Moreover, this teaching does not provide detail regarding the design and the construction of such modules additional to the one producing the pictogram.

The published patent document EP 1 793 261 A1 discloses a lighting device configured to display pictograms on a photoluminescent screen. The main application of such a device is to display pictograms in the field of vision of the driver of a vehicle, the windscreen of the vehicle then forming the photoluminescent screen. Such an application is commonly called a 'head-up display'. This teaching is therefore not suitable for displaying pictograms for the attention of individuals in the vicinity of the vehicle, such as in particular from a rear light.

The aim of the invention is to mitigate at least one of the drawbacks of the abovementioned prior art. More particularly, the aim of the invention is to enable a display of a light image, such as a pictogram, in combination with light signalling, that has more options, in particular in terms of size.

The subject of the invention is a lighting device, in particular for a motor vehicle, comprising a transparent or translucent screen; a lighting module able to project a light beam onto the screen; noteworthy in that the screen comprises a first diffusive area and a second non-diffusive area, such that a first part of the light beam projected onto the first area is diffused by the screen and that a second part of said beam is transmitted by said screen to an external projection surface.

Advantageously, the diffusive or non-diffusive nature of at least one of the first and second areas may be able to be varied over time and to be controlled.

According to one advantageous mode of the invention, the lighting module comprises a light source and a controlled imager able to form various images on the basis of a control signal.

According to one advantageous mode of the invention, the imager comprises a liquid crystal component able to transmit in a controlled manner the light emitted by the light source.

According to one advantageous mode of the invention, the light source has a lighting surface of less than or equal to 10 mm$^2$.

According to one advantageous mode of the invention, the lighting module is configured to form separate and independent light images on the first and second areas of the screen.

According to one advantageous mode of the invention, the lighting module is configured so that the light image(s) transmitted by the second area comprise pictograms. The term 'pictogram' is understood to mean a schematic graphical depiction, more particularly a stylized figurative drawing having a sign function, such as an arrow, an exclamation mark, etc.

According to one advantageous mode of the invention, the first and second areas are adjacent.

Advantageously, one of the first and second areas is situated inside the other of said areas.

According to one advantageous mode of the invention, the first area of the screen comprises a diffusive film and/or a surface with a regular relief forming a diffusive dioptric lens.

According to one advantageous mode of the invention, the second area of the screen is transparent and smooth.

According to one advantageous mode of the invention, the device comprises a housing with an aperture, which housing houses the lighting module, the screen forming an outer lens covering the aperture of the housing.

According to one advantageous mode of the invention, the second area of the screen is situated below the first area when the device is in the installed position.

According to one advantageous mode of the invention, the device is a motor vehicle rear light.

The provisions of the invention are advantageous in that they make it possible to project a light image onto a projection surface of a potentially large size, while the lighting device remains compact. The provisions of the invention are also advantageous in that a single lighting module performs at least two separate lighting functions, one being a diffusive beam and the other being a projection of an image outside of the lighting module.

Other features and advantages of the present invention will be better understood with the aid of the description and the drawings, in which.

Figure 1:
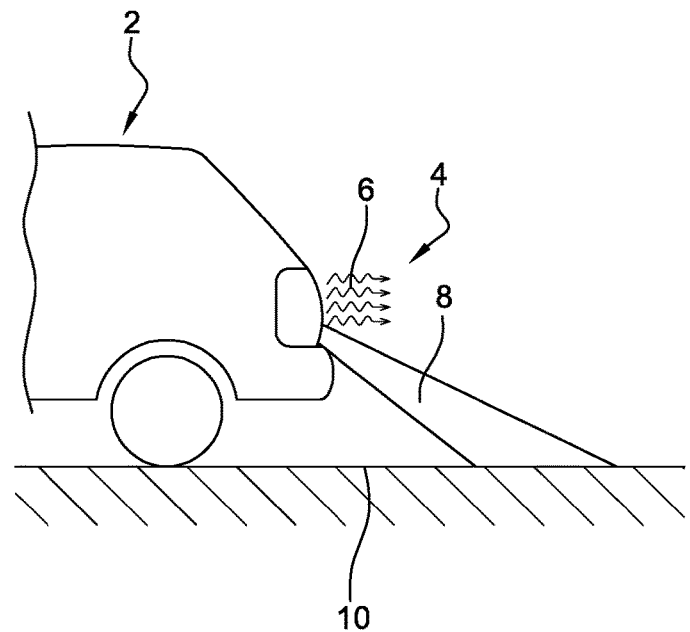
FIG. 1 is a schematic depiction of the rear part of a motor vehicle equipped with a lighting device according to the invention.

FIG. 1 schematically illustrates the functions of a lighting device according to the invention, the device in this case being positioned on a motor vehicle.

The motor vehicle 2 comprises, on its rear part, a lighting device in the form of a rear light. The lighting device 4 is configured to produce at least one signalling light beam 6 and to display a pictogram 8 on a projection surface 10 external to the lighting device 4. In this case, the projection surface is formed by the road 10 situated in the vicinity of the vehicle.

Figure 2:
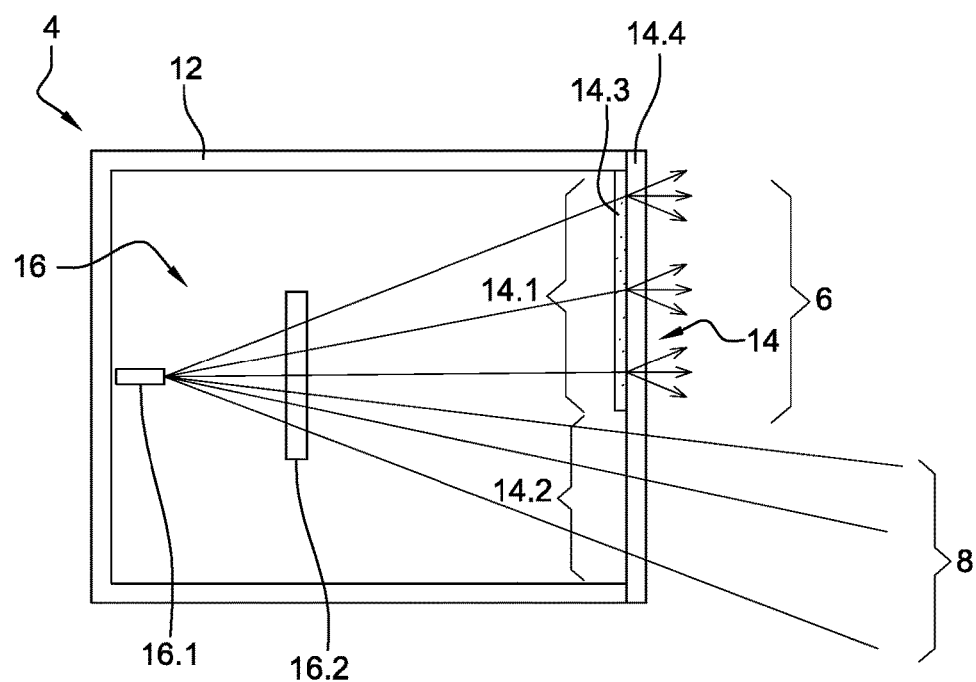
FIG. 2 is a cross-sectional and schematic view of the lighting device of FIG. 1.

FIG. 2 illustrates the lighting device of FIG. 1 schematically and in cross section. The device 4 comprises a housing 12 with an aperture, an outer lens 14 forming a screen, attached to the housing 4 and closing the aperture, and a lighting module 16. The module in question is configured to project a pictogram image, that is to say one that forms a schematic graphical depiction, or else a stylized figurative drawing having a sign function. To this end, the module 16 comprises at least one light source 16.1 and an optical device 16.2 able to form the pictogram from the light rays emitted by the light source(s) 16.1. The optical device 16.2 may be an imager able to form various pictograms on the basis of an electric control signal. Such an imager may comprise a mobile mirror able to reflect a light ray sweeping, periodically and rapidly, over a surface of the screen 14 corresponding to the pictogram to be displayed. The display may also comprise a microelectromechanical system (or MEMS in acronym form) forming a micromirror array. These micromirrors are pivotable and able to switch between two stable positions, one corresponding to an active state termed 'on', and the other to an inactive state termed 'off' (in which the light is reflected to an absorptive area). In the case of FIG. 2, the imager 16.2 is an electronic liquid crystal component, termed LCD, that is able to transmit the light emitted by the light source(s) 16.1 in a controlled manner depending on control signals. The various imagers described above are well known per se to those skilled in the art, and therefore do not need to be described further.

As is able to be seen in FIG. 2, the lighting module 16 forms a light cone that lights the inner face of the screen 14. Said face comprises a first diffusive area or portion 14.1 and a second transparent and non-diffusive area or portion 14.2. Each of the first and second areas 14.1 and 14.2 is lit by the light cone from the lighting module 16. The light encountering the first area is diffused when it is transmitted through the screen 14 so as to form the signalling light beam 6. This may be in particular a lamp function, a (flashing) direction indicator function, a stop light function, a reverse light function or else a fog light function. By contrast, the light encountering the second area is transmitted without or with very little diffusion so as to form a beam 8 projecting onto a projection surface situated outside of the lighting device 4, in this case the nearby road.

The lighting module 16 may thus be configured to form separate and independent images on the first and second areas 14.1 and 14.2. By way of example, the image produced on the first area may have a fixed geometry, in particular a simple geometry consisting in lighting the entire first area 14.1 homogeneously. The image produced on the second area 14.2, for its part, is a pictogram that is projected onto the external projection surface. This pictogram may be fixed or able to vary. A plurality of pictograms may be displayed selectively depending on certain circumstances linked to the vehicle and to its surroundings. The pictograms may in particular comprise logos or symbols having a meaning that is recognized and useful for traffic in the vicinity of the vehicle. By way of example, the pictograms may comprise an exclamation mark, an arrow or else a word expressing a situation.

The lighting module 16 is thus shared by the first and second areas 14.1 and 14.2 of the screen so as to form two light beams of different types, one being a light signalling beam and the other being a beam projecting a pictogram onto an external projection surface. To this end, this surface and the pictogram projected onto this surface may be of a size substantially greater than that of the corresponding area, in this case the second area 14.2, of the screen.

The diffusive nature of the first area 14.1 of the screen 14 may be achieved in various ways. By way of example, a coating or a strip made of diffusive material 14.3 may be formed on one of the two main opposite faces of a transparent wall 14.4 of the screen, at the first area. Such a coating or such a strip may comprise reflective microparticles that give rise to reflections in numerous directions. The strip made of diffusive material 14.3 may in particular be overmoulded over the transparent main wall 14.4. Again by way of example, the screen 14 may comprise, on at least one of its main opposite faces, a relief forming a dioptric lens with a complex surface that deflects the light in various directions through refraction.

Activation of the two light beams 6 and 8 is ensured by the lighting module 16, more particularly by the power supply of the light source 16.1 and by the advantageously electrical controlling of the optical imaging device 16.2. To form just the light beam 6, the light source 16.1 has to be activated and the optical imaging device 16.2 has to be configured to light only the first area 14.1. Similarly, to form just the light beam 8, the light source 16.1 has to be activated and the optical imaging device 16.2 has to be configured to light only the second area 14.2. To form the light beams 6 and 8 at the same time, the light source 16.1 has to be activated and the optical imaging device 16.2 has to be configured to simultaneously light the first and second areas 14.1 and 14.2.

The lighting device 16 has a point light source 16.2, such that the light beam that is produced has an infinite depth of field. This then allows the image projected onto the projection surface to remain sharp.

It should furthermore be noted that the projection surface may be something other than a portion of the road in the vicinity of the lighting device. Specifically, by way of example, a portion of the bodywork of the vehicle may serve as a projection surface, or else a specific projection surface may be provided on the vehicle.

The projection surface may display the pictogram through reflection, as is the case with the portion of the road in the vicinity of the lighting device, or through transmission. In the latter case, the projection surface then has to be transparent or translucent.

It should also be noted that the screen of the lighting device may comprise more than two areas, so as to produce more than two light beams. Specifically, it may be contemplated to provide a third area, the lighting module then being configured to selectively light each of the areas. As an alternative, an additional lighting module may be provided.

The invention claimed is:

1. Lighting device, for a motor vehicle, comprising:
a transparent or translucent screen;
a lighting module able to project a light beam onto the screen;
wherein
the screen comprises a first diffusive area and a second non-diffusive area, such that a first part of the light beam, projected onto the first area, is diffused by the screen and that a second part of said beam is transmitted by said screen to an external projection surface.

2. Lighting device according to claim 1, wherein the lighting module comprises a light source and a controlled imager able to form various images on the basis of a control signal.

3. Lighting device according to claim 2, wherein the controlled imager comprises a liquid crystal component able to transmit in a controlled manner the light emitted by the light source.

4. Lighting device according to claim 2, wherein the light source has a lighting surface of less than or equal to 10 mm$^2$.

5. Lighting device according to claim 1, wherein the lighting module is configured to form separate and independent light images on the first and second areas of the screen.

6. Lighting device according to claim 5, wherein the lighting module is configured so that the light image(s) transmitted by the second area of the screen comprise pictograms.

7. Lighting device according to claim 1, wherein the first and second areas of the screen are adjacent.

8. Lighting device according to claim 1, wherein the first area of the screen comprises a diffusive film and/or a surface with a regular relief forming a diffusive dioptric lens.

9. Lighting device according to claim 1, wherein the second area of the screen is transparent and smooth.

10. Lighting device according to claim 1, wherein the device comprises a housing with an aperture, which housing houses the lighting module, the screen forming an outer lens covering the aperture of the housing.

11. Lighting device according to claim 1, wherein the second area of the screen is situated below the first area when the device is in the installed position.

12. Lighting device according to claim 1, wherein the device is a motor vehicle rear light.

13. Lighting device according to claim 2, wherein the light source has a lighting surface of less than or equal to 10 mm$^2$.

14. Lighting device according to claim 2, wherein the lighting module is configured to form separate and independent light images on the first and second areas of the screen.

15. Lighting device according to claim 2, wherein the first and second areas of the screen are adjacent.

16. Lighting device according to claim 2, wherein the first area of the screen comprises a diffusive film and/or a surface with a regular relief forming a diffusive dioptric lens.

17. Lighting device according to claim 2, wherein the second area of the screen is transparent and smooth.

18. Lighting device according to claim 2, wherein the device comprises a housing with an aperture, which housing houses the lighting module, the screen forming an outer lens covering the aperture of the housing.

19. Lighting device according to claim 2, wherein the second area of the screen is situated below the first area when the device is in the installed position.

20. Lighting device according to claim 2, wherein the device is a motor vehicle rear light.

* * * * *